United States Patent [19]

Zagranski et al.

[11] 4,307,451
[45] Dec. 22, 1981

[54] BACKUP CONTROL

[75] Inventors: Raymond D. Zagranski, Newington; Albert H. White, Wethersfield, both of Conn.

[73] Assignee: Chandler Evans Inc., West Hartford, Conn.

[21] Appl. No.: 128,287

[22] Filed: Mar. 7, 1980

[51] Int. Cl.³ .............................................. F02C 9/28
[52] U.S. Cl. ........................... 364/431.02; 60/39.28 R
[58] Field of Search .................... 364/431; 60/39.28 R

[56] References Cited

U.S. PATENT DOCUMENTS 3,686,859  8/1972  White ............................. 60/39.28 R
4,212,161  7/1980  Newirth et al. ................ 60/39.28 R
4,228,650 10/1980  Camp ............................. 60/39.28 R

*Primary Examiner*—Charles E. Atkinson
*Assistant Examiner*—Gary Chin
*Attorney, Agent, or Firm*—Radford W. Luther; Richard A. Dornon

[57] ABSTRACT

A method of controlling fuel flow to a gas turbine engine includes computing the compressor discharge pressure from signals indicative of engine inlet temperature, engine speed and the computed scheduled fuel flow. The method permits accurate scheduling of fuel flow without employing a compressor discharge pressure sensor or continued engine operation in the event of sensor failure.

2 Claims, 1 Drawing Figure

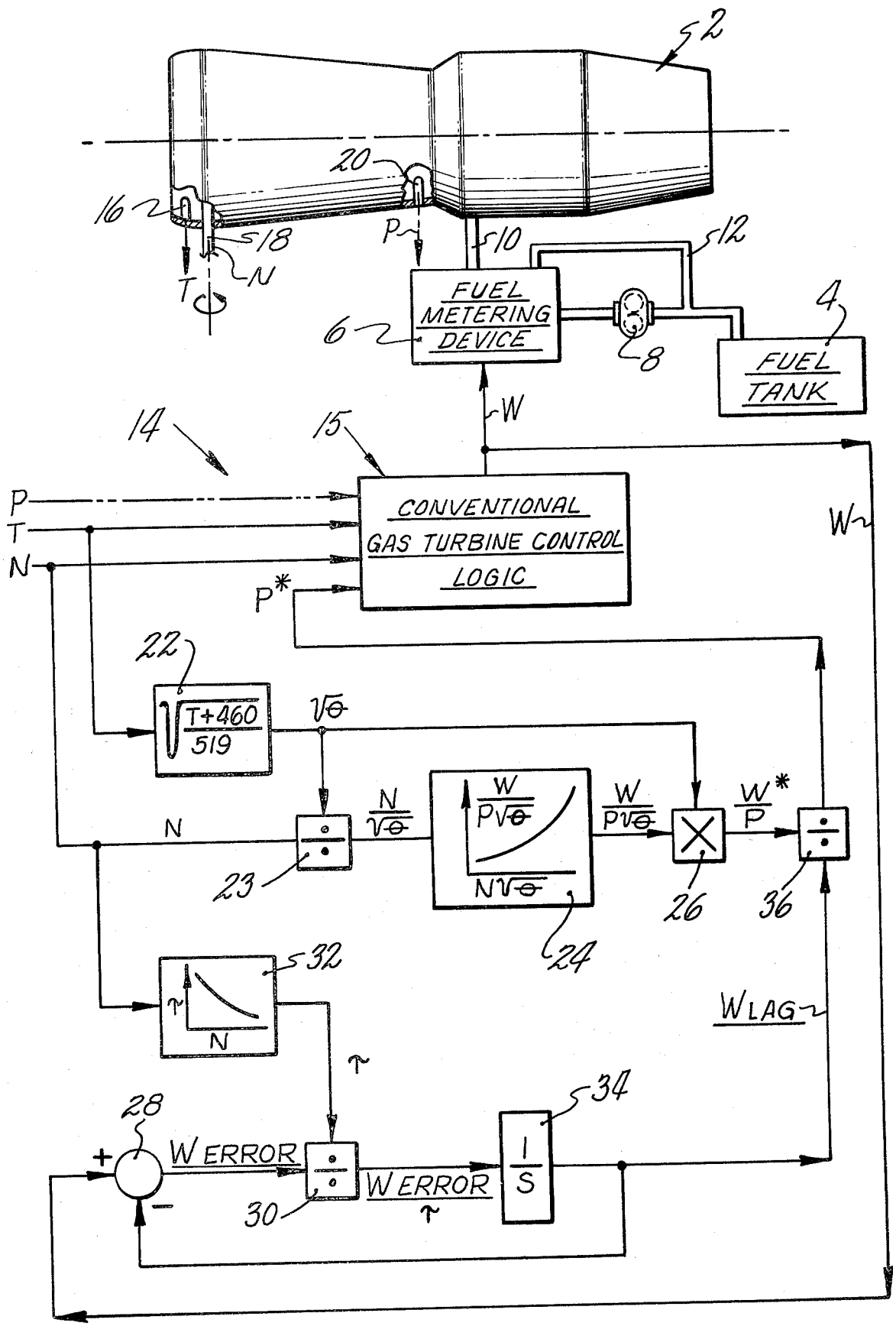

BACKUP CONTROL

BACKGROUND OF THE INVENTION

This invention relates to fuel controls for gas turbine engines and more particularly to computational devices for producing output signals reflecting a scheduled fuel flow for particular engine operating conditions.

The proper scheduling of acceleration and deceleration fuel flow to the burners of a gas turbine engine typically requires utilization of a number of engine parameters such as compressor inlet temperature, engine speed and compressor discharge pressure. Compressor discharge pressure is indicative of the engine air flow which must be determined so that the proper fuel-to-air ratio in the engine burners will be established. Failure to achieve the correct fuel-to-air ratio can result in compressor stall or overtemperature conditions.

Most conventional fuel controls for gas turbine engines employ pressure sensors to directly measure the compressor discharge pressure. Such sensors usually are adapted to produce either an electrical or mechanical output signal. Obviously, any malfunctioning or complete failure of the compressor discharge pressure sensor will vitiate the capability of the fuel control to accurately schedule fuel flow.

SUMMARY OF THE INVENTION

The invention provides a method of controlling a gas turbine engine which does not mandate the provision of a compressor discharge pressure sensor or other air flow indicator. The method of the invention is also adapted to provide for continued accurate fuel flow scheduling in a system in which an installed discharge pressure sensor malfunctions or fails.

According to the method of the invention, the output signal representing a scheduled fuel flow is utilized together with the signals representing compressor inlet temperature and speed to derive a signal indicative of compressor discharge pressure which, in turn, is employed to calculate the scheduled fuel flow. Known engine steady state running and time lag characteristics are also utilized to compute compressor discharge pressure.

The time lag characteristic of the engine is employed to simulate the normal time lag between metered fuel flow and engine compressor discharge pressure. The lag can be used to fine tune the fuel control to give accurate results during engine transient operation. By selecting the time lag to be slightly greater than actual engine performance, the computed values of pressure will be less than actual pressures beget during engine accelerations and greater than actual pressures beget during engine decelerations. Hence, during acceleration the engine will receive less than maximum fuel flow; and during deceleration, the engine will receive more than minimum fuel flow. Such transient fuel flows are beneficial in that they will respectively forestall compressor surge and flameout.

It is accordingly a primary object of the invention to provide a method of controlling fuel flow to a gas turbine engine in which the compressor discharge pressure is calculated from selected engine parameters and an output signal representing a scheduled fuel flow.

This and other objects and advantages of the invention will become more readily apparent from the following detailed description when taken in conjunction with the accompanying drawing in which:

BRIEF DESCRIPTION OF THE DRAWING

The drawing is a block diagram of a fuel control for a gas turbine engine which is adapted to carry out the method of the invention.

DETAILED DESCRIPTION OF PREFERRED EMBODIMENT

Referring to the drawing, there is shown a gas turbine engine 2, the fuel flow to which is controlled by a preferred method of the present invention. Fuel from a tank 4 is delivered to a fuel metering device 6 by means of a gear pump 8. Metered fuel from the fuel metering device 6 is delivered to the burner nozzle (not shown) of the engine 2 via a fuel supply conduit 10. The fuel metering device 6 includes a metering valve (not shown), across which a constant pressure head is maintained by a suitable bypass regulator (not shown). Bypassed fuel is directed back to the inlet side of the pump 8 through bypass conduit 12.

A fuel flow scheduling device, generally shown at 14, is adapted to sense various engine parameters and operator inputs (not illustrated) and produce an output signal W reflecting a scheduled fuel flow for particular engine operating conditions. The signals indicative of the sensed temperature T, sensed engine speed N, and sensed P or computed P* compressor discharge pressure are processed by conventional gas turbine engine control logic at 15 to produce an output signal W. Since the metering valve of the fuel metering device 6 has a constant head maintained thereacross, the fuel delivered to the engine is solely a function of its position. The output signal W is applied to the metering valve to control its position. For example, the metering valve may be a sliding plate type valve positioned by a stepper motor.

The engine 2 embodies a temperature sensor 16 for sensing compressor inlet temperature and generating a first signal T indicative of the sensed temperature. In addition, the engine 2 incorporates a speed sensor 18 for sensing engine speed and generating a second signal N indicative of the sensed speed. The engine 2 may also embody a compressor discharge pressure sensor 20 (or other air flow sensor) for generating a third signal P indicative of compressor discharge pressure should the method of the invention be utilized as a backup only in the event of sensor failure or malfunction.

The temperature signal T, which is in degrees Fahrenheit, is covered to the temperature correction factor $\sqrt{\theta}$ at 22. The temperature correction factor is divided into the sensed speed signal N at 23 to provide a corrected speed $N/\sqrt{\theta}$. For a particular engine, the steady state running characteristics are known; as depicted at 24, there is a unique steady state relationship between corrected speed $(N/\sqrt{\theta})$ and corrected fuel flow to discharge pressure ratio $W/P\sqrt{\theta}$. Comparing the corrected speed $(N/\sqrt{\theta})$ with the steady state running line yields a corrected ratio $W/P\sqrt{\theta}$ which is multiplied at 26 by $\sqrt{\theta}$ to obtain a calculated fuel flow to compressor discharge pressure ratio $W^*/P$.

The scheduled fuel flow output signal W and the engine time constant characteristics ($\tau$ v. N) are utilized to produce a lagged value of the fuel flow output signal $W_{lag}$ in order to reflect the typical dynamic relationship between actual engine fuel flow and actual engine compressor discharge pressure. It is important to note that since during an acceleration transient, the calculated ratio $W^*/P$ is smaller than the actual engine $W/P$, the quantity into which $W^*/P$ is divided must also be smaller if something near the actual engine P is to be obtained. To this end, when the lagged value of fuel flow $W_{lag}$ is divided by $W^*/P$, a relatively accurate value of P may be obtained.

The output signal W is compared with $W_{lag}$ at 28 to produce a fuel flow error ($W_{error}$). The fuel flow error is divided by the engine time constant $\tau$ at 30 to produce a lagged error quantity (W error/$\tau$. In order to derive the time constant, $\tau$ the sensed speed signal is compared at 32 with the known relationship between the engine time constant $\tau$ and engine speed N. The fuel flow error as scaled by the time constant (W error/$\tau$) is integrated at 34 to produce the $W_{lag}$ value. Finally, the calculated lagged value of fuel flow $W_{lag}$ is divided by the calculated fuel flow to compressor discharge pressure ratio $W^*/P$ at 36 to obtain the third signal $P^*$ which is employed to calculate scheduled fuel flow in exactly the same manner as a directly sensed parameter.

For steady state engine operation, the method of the invention will accurately predict P since the actual engine fuel flow to compressor discharge pressure ratio will be equal to the calculated value and the lagged value of fuel flow $W_{lag}$ will equal W. During an acceleration transient, W will be greater at a given speed than in steady state conditions, and hence, actual compressor discharge pressure will also be greater than its steady state value of that speed. However, due to the lag in the lagged fuel flow value $W_{lag}$, computed compressor discharge pressure is slightly less than that actually existing in the engine, thereby maintaining acceleration fuel flow somewhat under the maximum operating line to prevent compressor surge. Conversely, during deceleration, deceleration fuel flow will be greater than the minimum required to prevent flameout. It will, of course, be appreciated by those skilled in the art that the accuracy of the $P^*$ signal generated is predicated upon the conformance of the engine operating line with actual engine characteristics and correct fuel metering. However, it will be noted that there are satisfactory empirical methods for ascertaining engine operating characteristics and that conventional fuel metering systems are highly accurate in performing this function.

If the method of the invention is to be employed as a backup only, it will be understood that the method of switching from sensed P to computed $P^*$ admits of many variations. For example, if actual P deviates more than a certain percentage (e.g., 5%) from computed $P^*$, then $P^*$ could be substituted for P in fuel flow scheduling. Other methods could use direct signals which indicate sensor failure.

It is within the contemplation of the invention that $P^*$ could be generated in many ways. For example, a mechanical system could employ linkages, integrating pistons and piston actuated two dimensional cams, all of which are well-known in the art. An electrical system could comprise hard wired analog or digital circuitry or the calculations may be made by a properly programmed microcomputer.

Obviously, many variations and modifications are possible in light of the above teachings without departing from the scope and spirit of the invention as set forth in the appended claims.

Moreover, any engine parameter which can be related to engine fuel flow, such as gas temperature speed, thrust, etc., can be computed using the method of the invention.

We claim:

1. In a method of controlling fuel flow to a gas turbine engine of the type including the steps of:
   sensing compressor inlet temperature and providing a first signal indicative of the sensed temperature;
   sensing engine speed and providing a second signal indicative of the sensed speed;
   providing a third signal indicative of compressor discharge pressure; the improvement comprising generating the third signal by the method which includes the steps of:
   calculating a fuel flow to compressor discharge pressure ratio by utilizing the first and second signals together with known engine steady state running characteristics;
   calculating a lagged value of fuel flow by utilizing the second signal, known engine time constant characteristics, and a scheduled fuel signal;
   dividing the calculated lagged value of fuel flow by the calculated fuel flow to compressor discharge pressure ratio to obtain the third signal;
   calculating a forth signal indicative of scheduled fuel flow by utilizing the first, second and third signal; and utilizing the fourth signal to control a fuel metering device adapted to deliver fuel to the engine.

2. The method of claim 1 wherein said scheduled full flow signal used in calculating a lagged value of fuel flow is the fourth signal.

* * * * *